Aug. 8, 1933.   R. MacDOUGALL   1,921,763
DRAFT CONTROL APPARATUS FOR FURNACES
Original Filed Sept. 10, 1928   2 Sheets-Sheet 1

Witness:
Chas. R. Koursh.

Inventor,
Robert MacDougall
George Bayard Jones Atty.

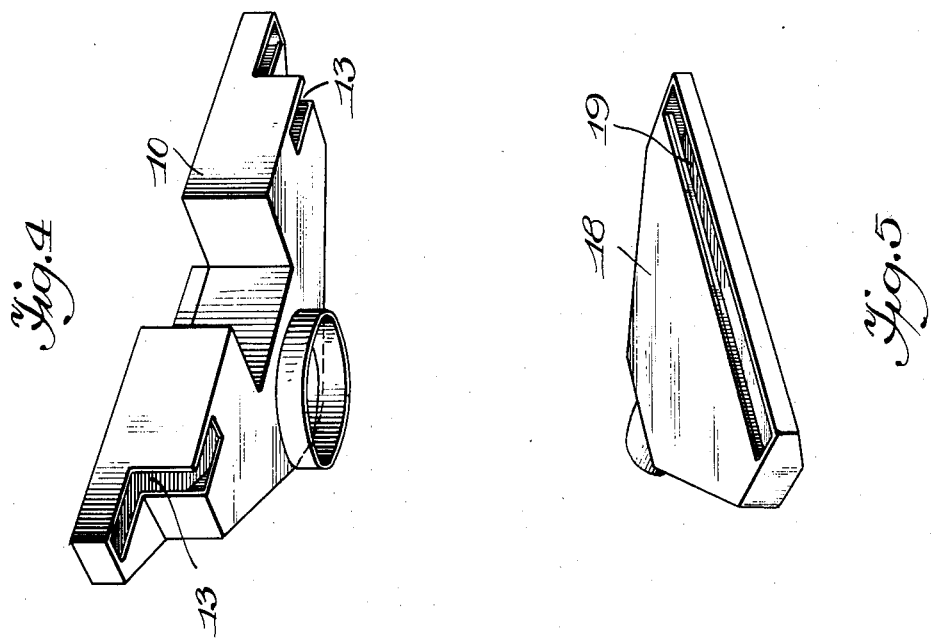
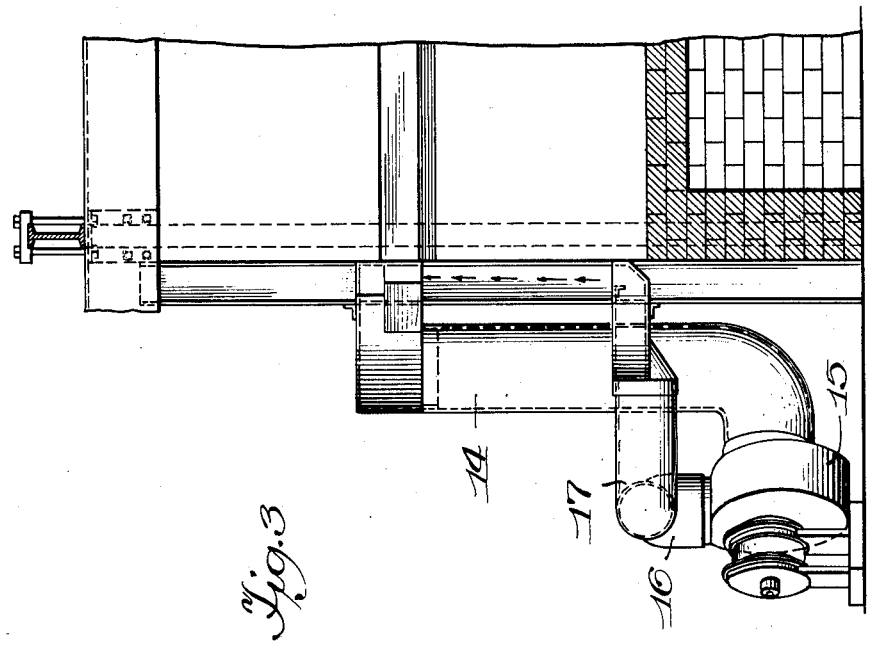

Patented Aug. 8, 1933

1,921,763

UNITED STATES PATENT OFFICE 1,921,763

DRAFT CONTROL APPARATUS FOR FURNACES

Robert MacDougall, Granite City, Ill., assignor to Beemack Furnace Company, Cicero, Ill., a Corporation of Illinois Original application September 10, 1928, Serial No. 304,945, now Patent No. 1,857,206. Divided and this application May 7, 1932. Serial No. 609,920

7 Claims. (Cl. 263—50)

This invention relates to draft control apparatus for furnaces.

The object of the invention is to provide means for controlling the escape of hot air out of, and the entrance of cold air into the open ends of furnaces, such as enameling furnaces.

This application is a division of my copending application for Enameling furnaces, Serial No. 304,945, filed September 10, 1928, which issued May 10, 1932 as Patent 1,857,206.

In the drawings:

Fig. 3 is a side elevation looking to the left as viewed in Fig. 2;

Fig. 4 is a detached perspective of an intake member of the draft controlling mechanism; and Fig. 5 is a similar view of an outlet member.

Figure 1:
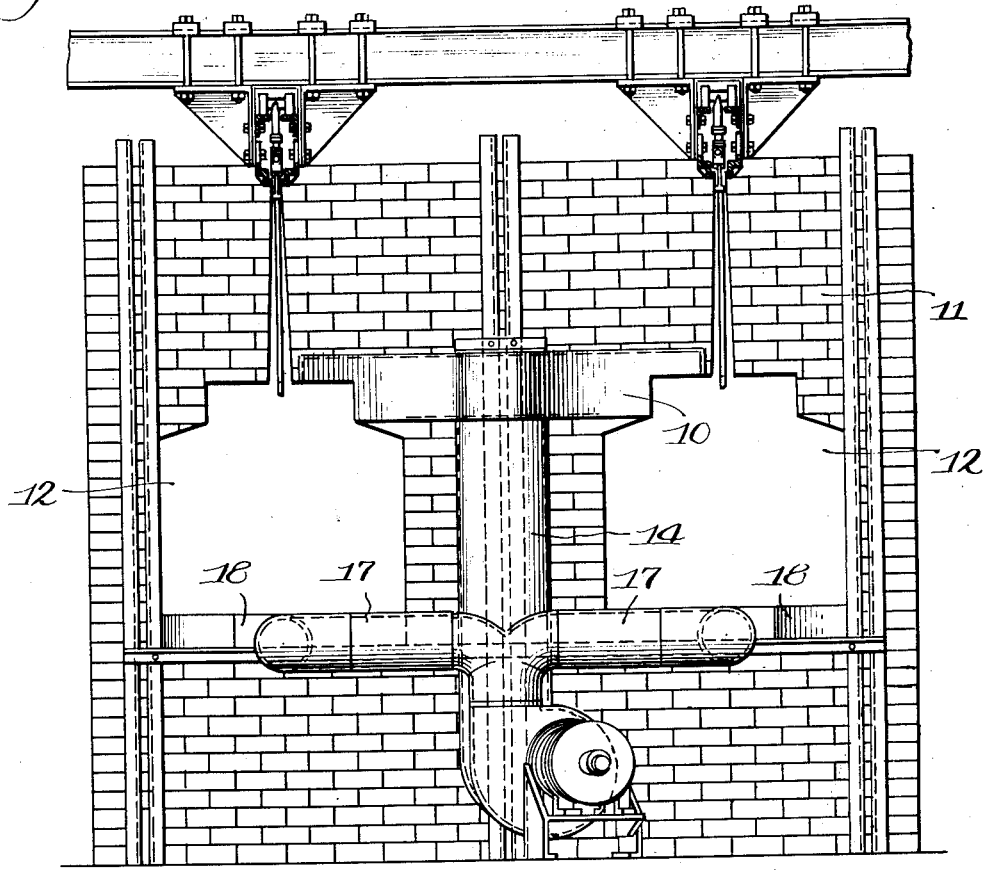
Fig. 1 is a front elevation of a draft controlling apparatus at one end of a furnace.
Figure 2:
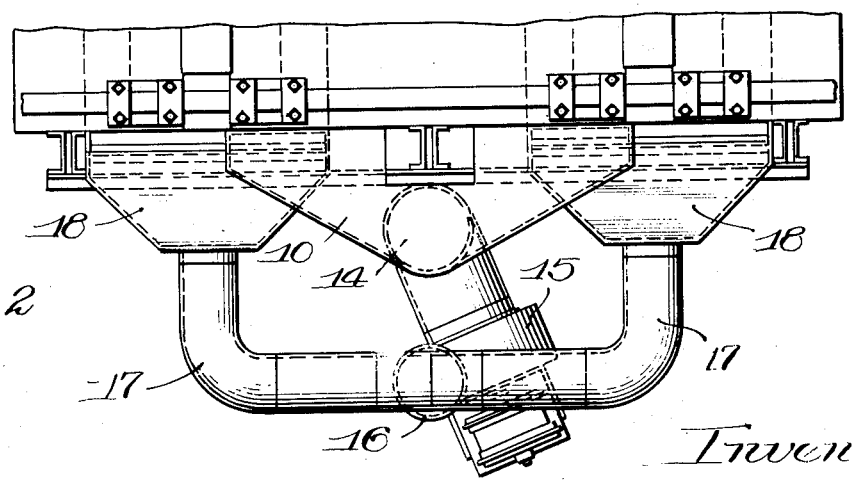
Fig. 2 is a top plan view of the same.

In furnaces of the type to which my invention relates, as described in the application above referred to, it has been found that at the openings at each end of the furnace a considerable volume of heated air will continually escape at the top, and at the bottom a considerable movement of cold air into the furnace will occur, the escape of the heated air apparently being to some extent enhanced by the heating and expansion within the furnace of the cold air entering at the bottom. Midway of the furnace opening there appears to be little movement of air either into the furnace or out of it. When there is a strong draft through the building in which the furnace is situated, it has been further observed that considerably more heat will escape at one end of the furnace than the other. In order to reduce the loss of heat and attain greater regularity in the operation of the furnace, I have devised a novel draft control apparatus which may be used at either or both ends of the furnace, or in any furnace in which similar conditions obtain.

In the form shown, the apparatus includes a double suction box 10, which is secured to the furnace wall 11 adjacent the top of the two furnace openings 12 at the desired end of the furnace, and is formed with openings 13 on its lower side adapted to draw in heated air tending to escape out of the top portion of the furnace openings. The suction box 10 is connected by a pipe 14 with the intake of a blower 15, the outlet of the blower being connected by a pipe 16 having branches 17—17 connected with blower boxes 18—18 each secured to the furnace wall 11 adjacent the bottom of the furnace openings. The blower boxes 18 are formed each with a draft outlet 19 extending across the bottom of one of the furnace openings 12 and are arranged to discharge, transversely of the openings and towards the inlet openings 13 of the suction box 10, the heated air which has been drawn in through such suction boxes, thus maintaining at the furnace openings transverse sheets or blasts of heated air which act as a barrier to the objectional inward and outward currents above mentioned.

As shown in Fig. 1 there is a slot through the roof extending upwardly from each of the longitudinal openings or passageways through the furnace. The suction box 10 is located adjacent the central support for the roof and the inlet openings 13 extend approximately from said intermediate support to said slots. Thus the structure does not interfere with the vertical members which depend through said slots from the overhead conveyors.

It would obviously be possible to provide additional suction boxes at the outer top sides of the furnace openings, also connected with the blower, but in practice this is sometimes found unnecessary.

I claim:

1. In a furnace of the class described and having a heated passage provided with a constantly open opening, a draft control device at said opening including a pump having an intake connection arranged to draw in heated air adjacent the top of the opening and a discharge connection arranged to discharge such air in a transverse stream upwardly from the bottom of such opening.

2. In a furnace of the class described and having a heated passage provided with a constantly open opening, a draft control device at said opening including a pump having its intake connected to a suction box having on its inner side a suction opening arranged to draw in heated air along a line at the top of the furnace opening and connected also to a discharge box having on its upper side a discharge opening extending along the bottom line of the furnace opening and arranged to discharge the air drawn in upwardly in a transverse thin stream extending towards the line of said suction opening.

3. In a furnace of the class described and having parallel heated passages provided with adjacent constantly open openings, a draft control device adjacent said openings including a pump having its intake connected to a suction box arranged between and at the top of said furnace openings and having on its under side separated openings arranged to severally draw in heated air from said furnace openings, and having its discharge connected to separate discharge boxes having each on its upper side a discharge opening extending along the bottom line of the particular furnace opening and arranged to discharge the air drawn in by said pump upwardly in a transverse thin stream extending towards the line of the suction opening thereabove.

4. In a furnace comprising side walls, a roof, and an intermediate support therefor, providing parallel heated passages each having an open end adjacent the other, and a slot through the roof extending upwardly from each of said passages, a draft control device adjacent said ends, including a suction box arranged between and at the top of said furnace openings and having separated openings therein each located between said intermediate support and the corresponding slot to draw in heated air from said furnace openings, discharge boxes each having a discharge opening extending along the bottom line of one of said furnace openings, a blower having its intake connected to said suction box and having its outlet connected to said discharge boxes, whereby the air drawn in by the blower is directed upwardly from said discharge openings in transverse thin streams extending toward the suction openings thereabove.

5. In a furnace comprising side walls, a roof, and an intermediate support therefor, providing parallel heated passages each having an open end adjacent the other, and a slot through the roof extending upwardly from each of said passages, a draft control device outside of said furnace adjacent said ends and including an upper box arranged between and at the top of said furnace openings and having separated openings therein each located between said intermediate support and the corresponding slot, lower boxes each having an opening extending along the bottom line of one of said furnace openings, a blower having its intake connected to one of said boxes and having its outlet connected to another of said boxes, whereby heated air is drawn in by the blower and directed across said furnace openings in a thin stream.

6. Means for reducing escape of heated air from the open end of a furnace, comprising air circulating mechanism having an interconnected intake and outlet arranged substantially oppositely with reference to said open end and outside the same, for creating a current of air across the same.

7. Means for reducing escape of heated air from the open end of a furnace, comprising air circulating mechanism having an air intake member disposed adjacent the top of said open end, and an oppositely positioned air outlet member connected thereto and extending along substantially the entire opposite side of said opening for directing a current of air upwardly across said open end toward said intake member.

ROBERT MacDOUGALL.